US005475812A

United States Patent [19]

Corona et al.

[11] Patent Number: 5,475,812
[45] Date of Patent: Dec. 12, 1995

[54] METHOD AND SYSTEM FOR INDEPENDENT CONTROL OF MULTIPLE WINDOWS IN A GRAPHICS DISPLAY SYSTEM

[75] Inventors: James Corona, San Diego, Calif.; Randal L. Henderson; Gregory D. Laib, both of West Hurley, N.Y.

[73] Assignee: International Business Machines Corporation, Armonk, N.Y.

[21] Appl. No.: 299,170

[22] Filed: Aug. 29, 1994

Related U.S. Application Data

[63] Continuation of Ser. No. 943,968, Sep. 11, 1992, abandoned.

[51] Int. Cl.[6] .............................. G06F 3/14; G06F 15/62

[52] U.S. Cl. .......................... 395/158; 395/152; 395/157; 395/164

[58] Field of Search .................................... 395/119, 122, 395/135, 155, 157, 158, 161, 152, 164; 345/119, 120

[56] References Cited

U.S. PATENT DOCUMENTS

| | | | |
|---|---|---|---|
| 4,317,114 | 2/1982 | Walker . | |
| 4,484,187 | 11/1984 | Brown et al. . | |
| 4,555,775 | 11/1985 | Pike . | |
| 4,598,384 | 7/1986 | Shaw et al. . | |
| 4,823,108 | 4/1989 | Pope . | |
| 4,835,527 | 5/1989 | Hersh . | |
| 4,914,607 | 4/1990 | Takanashi et al. . | |
| 4,933,879 | 6/1990 | Ando et al. . | |
| 4,947,257 | 8/1990 | Fernandez et al. . | |
| 4,951,229 | 8/1990 | DiNicola et al. | 395/152 |
| 4,954,818 | 9/1990 | Nakane et al. . | |
| 4,955,024 | 9/1990 | Pfeiffer et al. . | |
| 4,985,848 | 1/1991 | Pfeiffer et al. . | |
| 5,003,491 | 3/1991 | Heckt | 395/135 |
| 5,025,249 | 6/1991 | Seiler et al. | 345/119 |
| 5,027,212 | 6/1991 | Marlton et al. . | |
| 5,029,111 | 7/1991 | Mansell . | |
| 5,043,923 | 8/1991 | Joy et al. | 395/157 |
| 5,091,720 | 2/1992 | Wood | 395/157 |
| 5,128,658 | 7/1992 | Pappas et al. | 345/199 |

FOREIGN PATENT DOCUMENTS

| | | |
|---|---|---|
| 0392551 | 10/1990 | European Pat. Off. . |
| 0403122 | 12/1990 | European Pat. Off. . |
| 0456411 | 11/1991 | European Pat. Off. . |
| 0486155 | 5/1992 | European Pat. Off. . |

*Primary Examiner*—Raymond J. Bayerl
*Assistant Examiner*—Huynh Ba
*Attorney, Agent, or Firm*—Mark S. Walker; Andrew J. Dillon

[57] ABSTRACT

A method and system for independent control of multiple windows in a graphics display system. Intensity data for a first plurality of pixels is specified for an underlying image within a first window. A first window identifier is associated with each of the first plurality of pixels. Next, intensity data for a second plurality of pixels is specified for an overlying image within a second window. A second window identifier is associated with each of the second plurality of pixels. The intensity data and window identifiers for the overlying and underlying images are then stored in separate locations within a frame buffer. Finally, an overall image is displayed, wherein the overall image contains the underlying image and the overlying image superimposed over at least a portion of the underlying image. The intensity data and the window identifiers are utilized to display the overall image. The window identifiers provide for independent control of the first and second windows so that the first plurality of pixels can be updated while the overall image is displayed.

15 Claims, 6 Drawing Sheets

METHOD AND SYSTEM FOR INDEPENDENT CONTROL OF MULTIPLE WINDOWS IN A GRAPHICS DISPLAY SYSTEM

This is a continuation of application Ser. No. 07/943,968, filed 11 Sep. 1992, abandoned.

BACKGROUND OF THE INVENTION

1. Technical Field

The present invention relates in general to graphics display systems, and more particularly to a method and system for independent control of multiple windows in a graphics display system. Still more particularly, the present invention relates to a method and system for independent control of overlay and color planes in a graphics display system.

2. Description of the Related Art

Computer graphics display systems of contemporary design use windows to highlight or concurrently display independent blocks of information. The user of the system routinely has the power to operate within a window, operate in areas outside a window, or to relate activities of various windows.

U.S. Pat. No. 4,317,114, Walker, entitled Composite Display Device For Combining Image Data and Method, issued Feb. 23, 1982, teaches a method for displaying a set of overlay images superimposed over a host image on a display monitor. U.S. Pat. No. 4,954,818, Nakane et al., entitled Multi-Window Display Control System, issued Sep. 4, 1990, discloses a method and system for providing a multi-window display control system where a plurality of data are overlapped and displayed simultaneously on one display monitor.

As known in the art, the image displayed on the display monitor is typically stored in a memory array known as a frame buffer. The frame buffer is periodically scanned or otherwise accessed to ascertain the color, intensity and other information used to generate the image on the display monitor itself. A frame buffer contains, among other items, color planes, overlay planes and window identification planes.

Color planes are comprised of pixels and contain a rendered image for display on the display monitor. Overlay planes, also comprised of pixels, are used to supersede the pixels in the color planes. The image in the color planes remains intact while the portion of the image in the overlay planes can be moved independently of the total image, and can be superimposed over at least a portion of the image in the color planes.

As discussed above, windows are independent portions of the screen that each represent an application. The image as stored in the frame buffer normally includes the resultant effect of overlying windows because each window is assigned an identifier number that is drawn into the window identification planes to define the boundaries of the window. As each application creates an image or "renders" to the color planes, the window identifier associated with the application defines the area where the application can be drawn. In other words, only the portion of the image which will be displayed in the window is sent to the color planes.

Contemporary graphics display systems typically contain only one set of window identification planes. As a result, overlay planes are constrained to the same window boundaries as the color planes for any particular window identifier.

Therefore, when an image in the overlay planes is superimposed over at least a portion of the image in a color planes, the color data can not be rendered to the pixels in the color planes which lie underneath the image in the overlay planes. Consequently, when a window is removed from view, the image in the color planes must be regenerated in the changed region of the frame buffer.

Another problem encountered with the utilization of one set of window identification planes involves transparent areas within an overlay. A user may want to have all or a portion of an image in the overlay plane be transparent so that the color image below the image in the overlay plane is displayed. This is not possible with systems which utilize only one set of window identification planes. The window identifier in the area of the overlay can be utilized only by the overlay image. A window identifier for the image below the overlay image is not available. Thus, the transparency effect can not be achieved in such systems because proper pixel interpretation is impossible.

Therefore, it should be obvious that a need exists for a system and method which provides for independent control of color and overlay planes in a graphics display system.

SUMMARY OF THE INVENTION

It is therefore one object of the present invention to provide separate window identification planes in a graphics display system.

It is another object of the present invention to provide a method and system for independent control of underlying and overlying images in a graphics display system.

It is yet another object of the present invention to provide a method and system which improves the speed of modifying an image in a graphics display system.

The foregoing objects are achieved as is now described. Intensity data for a first plurality of pixels is specified for an underlying image within a first window. A first window identifier is associated with each of the first plurality of pixels. Next, intensity data for a second plurality of pixels is specified for an overlying image within a second window. A second window identifier is associated with each of the second plurality of pixels. The intensity data and window identifiers for the overlying and underlying images are then stored in separate locations within a frame buffer. Finally, an overall image is displayed, wherein the overall image contains the underlying image and the overlying image superimposed over at least a portion of the underlying image. The intensity data and the window identifiers are utilized to display the overall image. The window identifiers provide for independent control of the first and second windows so that the first plurality of pixels may be updated while the overall image is displayed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
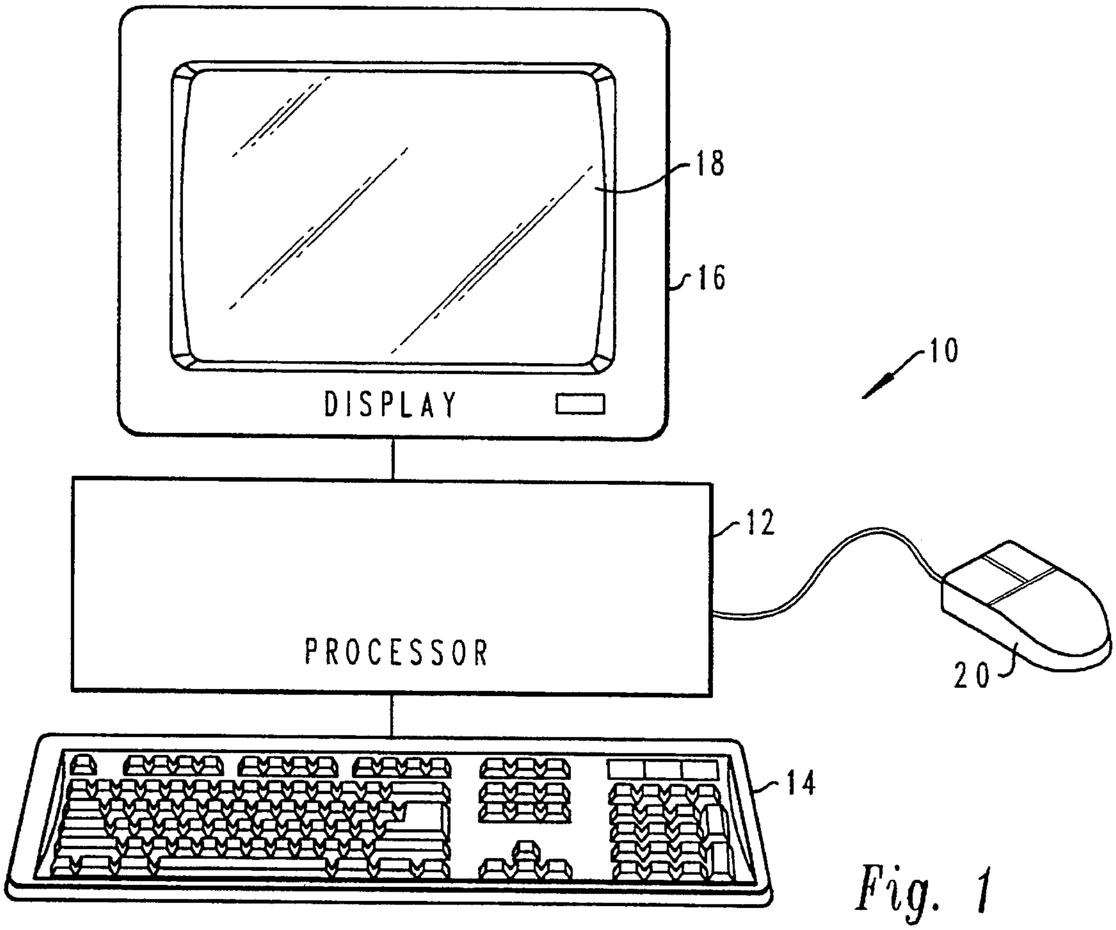
FIG. 1 is a pictorial representation of a personal computer system which may be utilized to implement the method and system of the present invention.

With reference now to the figures and in particular with reference to FIG. 1, there is depicted a pictorial representation of a personal computer system 10 which may be utilized to implement the method and system of the present invention. Personal computer system 10 includes a computer 12, keyboard 14, a display monitor 16 having a display screen 18, and an input device 20, illustrated here as a mouse.

Figure 2A:
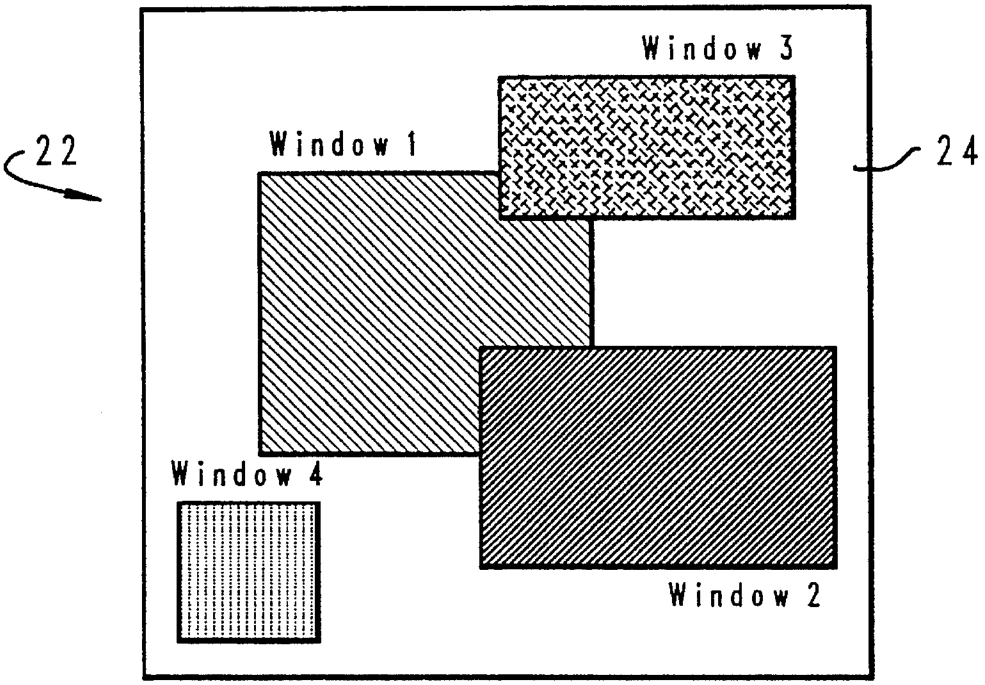
FIG. 2A is a pictorial representation of four windows as visually perceived on a display monitor.

FIG. 2A is a pictorial representation of four windows as visually perceived on a display screen. The image as displayed on display screen 22 is composed of a background region 24 and four individually numbered windows. The priority of the windows is such that windows 2 and 3 overlap and obstruct a portion of window 1. Window 4 is displayed apart from windows 1, 2 and 3.

Windows 1–4 are independent portions of the display screen 22, and each represents an application. Each of the windows and the background is displayed by utilizing a plurality of pixels on the display screen 22. In order to achieve the image as displayed on display screen 22, each of the pixels are assigned a window identifier. This window identifier is stored in window identification planes and define the boundaries of each window. As each application renders its corresponding image, the window identifier associated with the application defines the area on the display screen 22 where the application can be drawn. In other words, only that portion of the image which will be displayed in a window is stored in the color planes and overlay planes. Thus, the image on display screen 22 is generated.

Figure 2B:
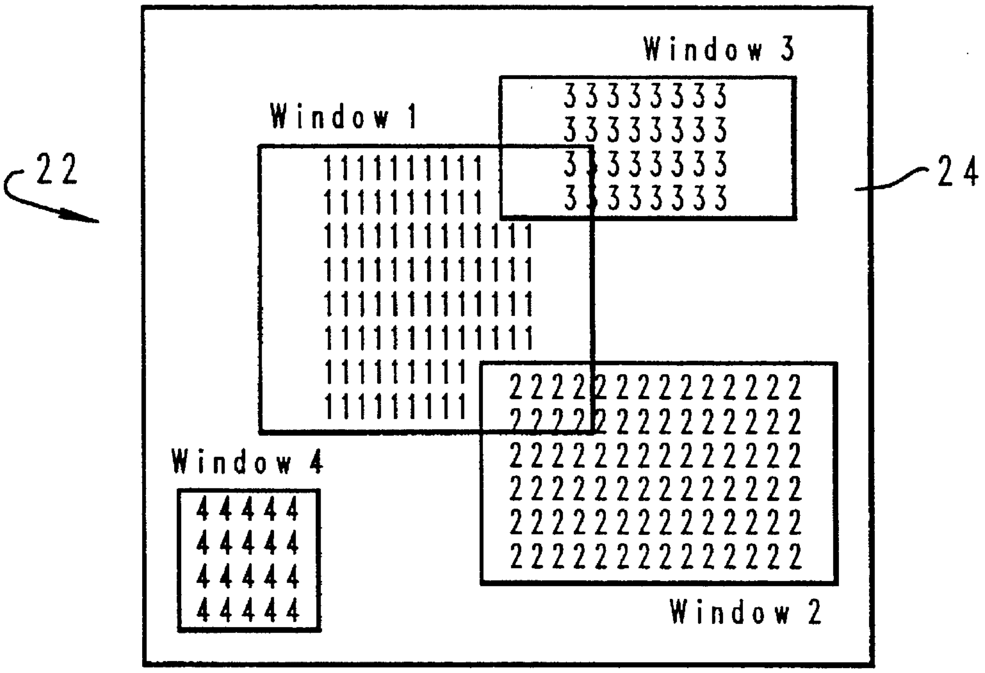
FIG. 2B is a pictorial representation of the priority of the windows depicted in FIG. 2A, where the priority of the windows is illustrated by numerical values.

FIG. 2B is a pictorial representation of the priority of the windows depicted in FIG. 2A, where the priority of the windows is illustrated by numerical values. The priority of background region 24 typically has a numerical value of 0, but the zeros are omitted for clarity. One method which establishes priority is the higher the number, the higher the priority. Thus, since window 2 has a higher priority than window 1, that portion of window 2 which overlaps window 1 is displayed instead of the underlying window 1. The same is true for window 3. Those skilled in the art will recognize that other methods may be utilized to establish priority, one example being the last window drawn is the top window displayed.

Figure 3:
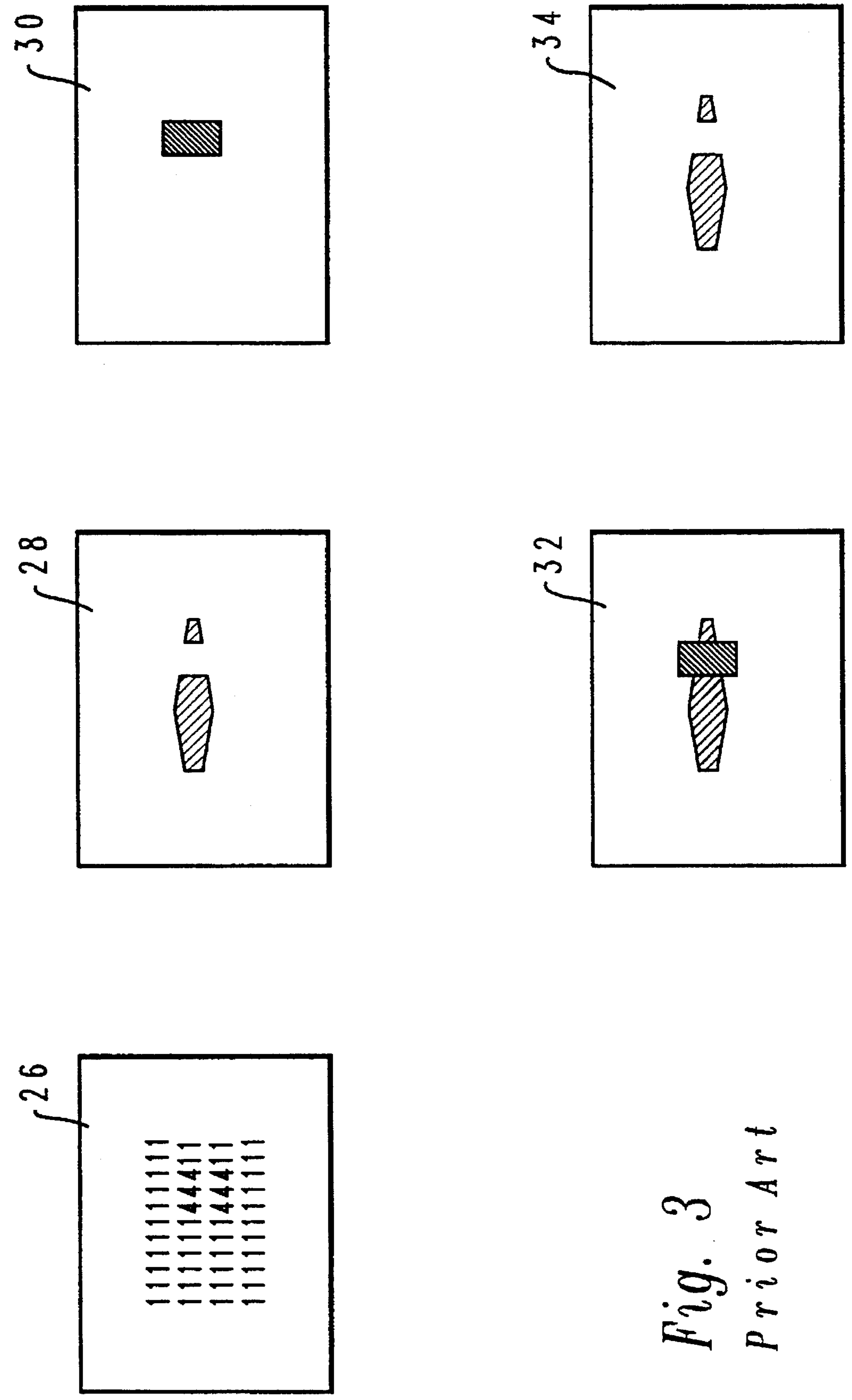
Fig. 3 Prior Art
FIG. 3 is a pictorial representation of an overlying image and an underlying image displayed on a graphics display system according to the prior art.

With reference now to FIG. 3, a pictorial representation is depicted of an overlying image and an underlying image displayed on a graphics display system according to the prior art. Block 26 illustrates the priority numerical values for an underlying image (numerical value of 1) and an overlying image (numerical value of 4). Again, every pixel in the display screen has a window identifier associated with it. The background window identifier is typically defaulted to 0, but the zeros are omitted for clarity.

Block 28 depicts the underlying image as it is stored in the color planes and displayed on the display screen. The overlying image as it is stored in the overlay planes and displayed on the display screen is illustrated in block 30. Block 32 depicts the entire image as displayed on the display screen.

Prior art graphic display systems typically utilize only one set of window identification planes. This means that overlay planes are constrained to the same window boundaries as the color planes for any particular window identifier. In other words, the underlying image can not be rendered underneath the overlying image. Thus, when the overlying image is removed, the underlying image is incomplete and must be rerendered. This problem is illustrated in block 34. To make the image in block 34 complete, the window identifiers where the overlying image had been previously displayed must be restored to ones and the color image rerendered.

Figure 4:
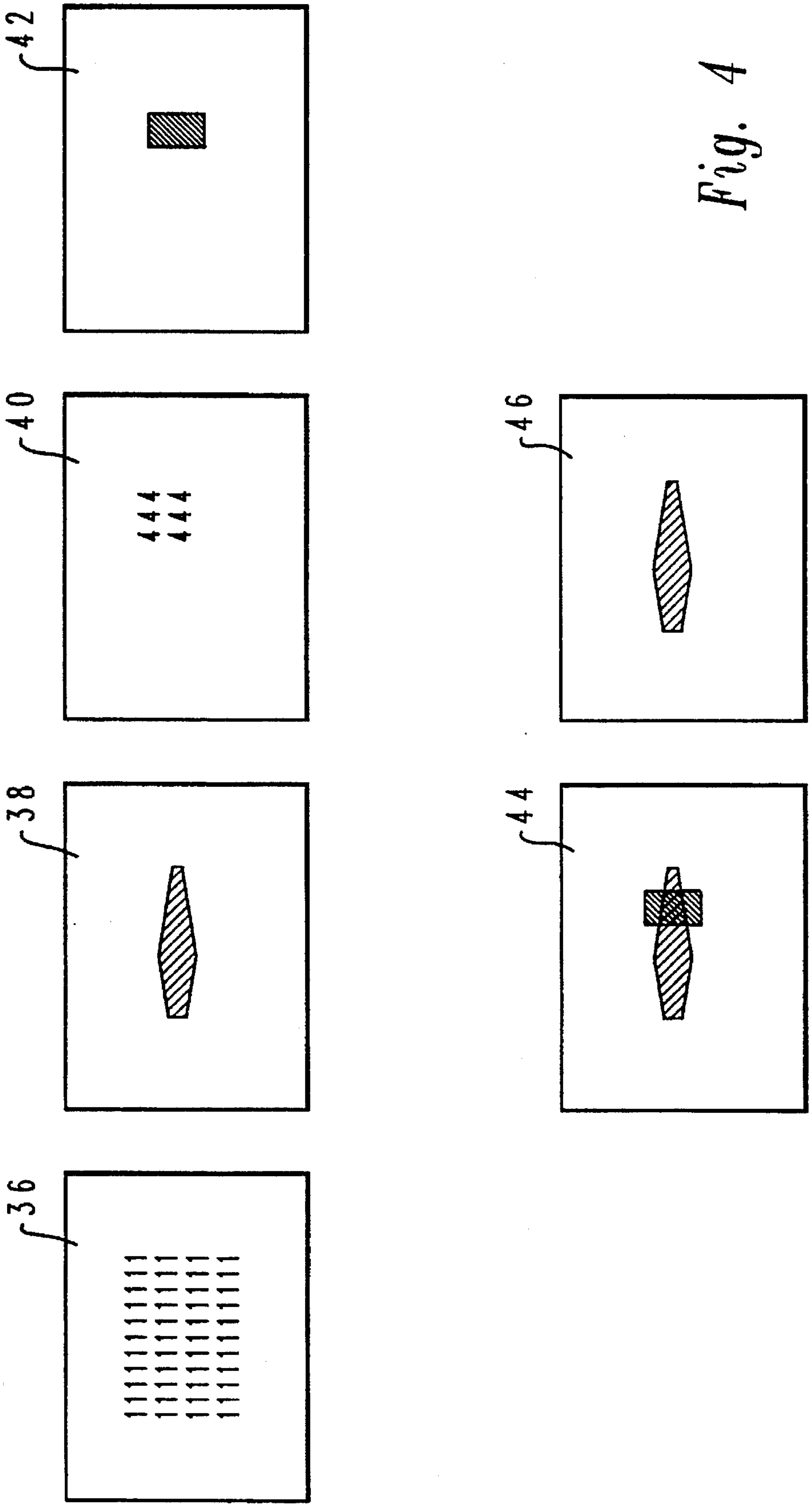
FIG. 4 is a pictorial representation of an overlying image and an underlying image displayed on a graphics display system according to the present invention.

FIG. 4 is a pictorial representation of an overlying image and an underlying image displayed on a graphics display system according to the present invention. In a graphics display system which embodies the present invention, separate window identification planes are provided for the color and overlay planes, and the separate window identification planes independently control the color and overlay planes. Block 36 illustrates the priority numerical values for an underlying image (numerical value of 1). As discussed above, every pixel in the display screen has a window identifier associated with it. The background window identifier is omitted for clarity. Block 38 depicts the underlying image as it is stored in the color planes and, if unobstructed, displayed on the display screen.

Block 40 illustrates the priority numerical values for an overlying image (numerical value of 4). Again, the background window identifier is omitted for clarity. The overlying image as it is stored in the overlay planes and displayed on the display screen is illustrated in block 42, and block 44 depicts the entire image as displayed on the display screen.

As can be seen, in block 38 and block 42 both images are completely displayed in the color and overlay planes, respectively. This is not possible with the graphics display system of FIG. 3. Providing separate window identification planes for the color and overlay planes allows for independent rendering of images into the color and overlay planes.

Furthermore, using the system and method of the present invention, the underlying image can be updated or modified while the overlying image is displayed. This is because the window identifier for the underlying image is stored in a separate window identification plane from the overlying image window identification plane. Consequently, the entire underlying image is displayed and does not need to be rerendered when the overlying image is removed, as shown in block 46. This improves the speed of displaying graphical images.

The method and system of the present invention also provides for the utilization of transparent overlays. For example, in block 44 of FIG. 4, if any of the pixels in the overlying image are transparent, the underlying image is visible in those locations. For example, if there are four bits available for overlay colors, a total of possible color combinations may be specified. If a user desires all or a portion of the overlay image be transparent, the four bits can be combined so that fifteen color combinations and a clear may be specified. In this manner, all or a portion of the image in the overlay planes specified with a clear is not shown, and the underlying image is shown.

Figure 5:
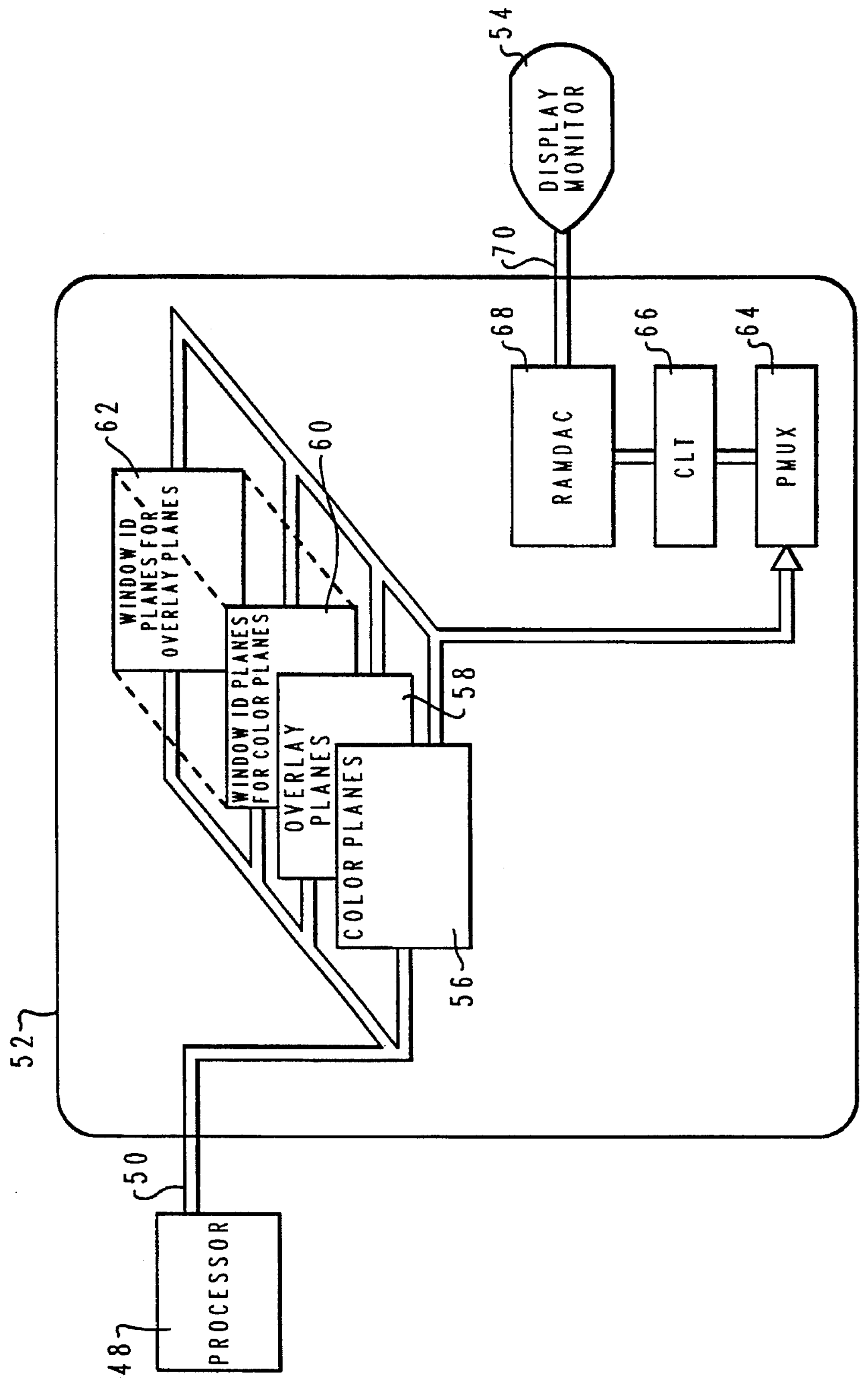
FIG. 5 is a block diagram of the major elements of a graphics display system according to the present invention.

FIG. 5 is a block diagram of the major elements of a graphics display system according to the present invention. A processor 48 running an application or operating system program generates output signals which are transmitted along data path 50 to a graphics display adapter 52. Graphics display adapter 52 has as its primary function the conversion of the output signals into a form suitable for generating control signals to create a display on a display monitor 54. Display monitor 54, in the preferred embodiment, is a standard display monitor responsive to red, green and blue controls signals, one example being an IBM Model 6091 High Resolution Display. The values of the incoming red, green and blue control signals cause the display monitor 54 to display an image with the requisite color.

Graphics display adapter 52 has the following major components. Output signals from the processor 48 are formatted and stored in a frame buffer. The frame buffer is represented by blocks 56, 58, 60 and 62. Block 56 represents the color planes, block 58 represents the overlay planes, block 60 represents the window identification planes for the color planes, and block 62 represents the window identification planes for the overlay planes.

Pixel multiplexer (PMUX) 64 reads the pixel information from the color planes, overlay planes, and separate window planes and performs the necessary decoding and image mixing. In other words, PMUX 64 combines the images contained on the various planes according to their priority. The merged images are then passed through the color translation table (CLT) 66 and Digital to analog converter (DAC or RAMDAC) 68 which generate the appropriate control signals to be passed on data line 70 to display monitor 54. The CLT 66 and the RAMDAC 68 are illustrated as separate components of the graphics display adapter 52, but those skilled in the art will recognize that CLT 66 and RAMDAC 68 may also be a single component.

Figure 6:
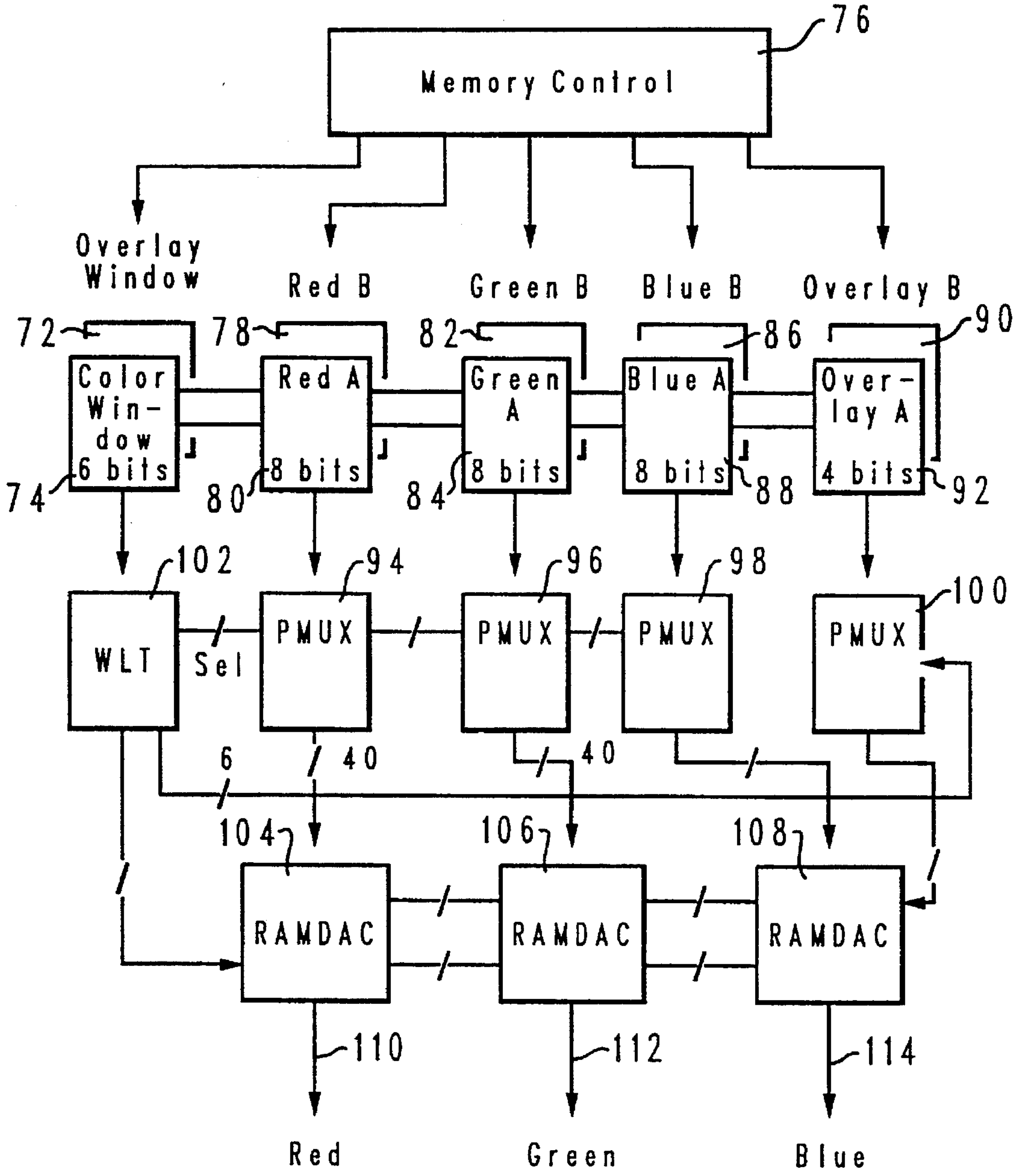
FIG. 6 is a block diagram depicting the architecture of a frame buffer which may be utilized to implement the method and system of the present invention.

Referring now to FIG. 6, a block diagram depicts the architecture of a frame buffer which may be utilized to implement the method and system of the present invention. The frame buffer illustrated in FIG. 6 provides separate window identification planes for overlay and color planes. This particular frame buffer also supports the concept of double buffering. Double buffering is the technique of updating or rendering to one set of planes (e.g. frame buffer A) while the other set of planes (frame buffer B) is being displayed. This concept prevents image breakup that can occur if you are updating the same buffer you are displaying. Window identification planes do not need to be double buffered because they are not constantly updated or swapped like the color and overlay planes. Even though window identification planes are not doubled buffered, the video memory structure is more efficient if two sets of window identification planes are present. Thus, the second set of window identification planes may be utilized as an independent set of window identification planes for the overlay planes. This block diagram illustrates only one implementation of a frame buffer, however, and those skilled in the art will recognize that any number of memory structures may be utilized to provide the same function.

Block 72 depicts the window identification planes used by the overlay planes, while block 74 illustrates the window identification planes utilized by the color planes. The window identification planes 74 used by the color planes scissor what is drawn by the memory controller 76 into the color planes 78, 80, 82, 84, 86, 88 and the window identification planes 72 utilized by the overlay planes scissor what is drawn into the overlay planes 90, 92. Scissoring is a technique known in the art which defines the area on the display screen where an application or image will be drawn, and is accomplished by utilizing the window identifier associated with the pixels which make up the image.

During display, both the color A planes 80, 84, 88 and the color B planes 78, 82, 86 are scanned out into pixel multiplexers (PMUX) 94, 96, 98. Overlay A plane 92 and overlay B plane 90 are scanned out into the overlay PMUX 100. At the same time, both window planes 72, 74 are scanned into the window lookup table (WLT) 102. The WLT is an index of the window identifiers, and is organized so that buffer A or buffer B is selected for a particular window identifier. The window identifiers for the color planes and the window identifiers for the overlay planes have separate tables that allow for independent selection of the color buffers and of the overlay buffers. Additionally, the WLT can also have a configuration bit that allows the window identifiers for the color planes to index the overlay window lookup table to support applications that do not make use of the independent color and overlay window planes capability.

Still referring to FIG. 6, the data is then scanned into Digital to Analog Converters (RAMDAC) 104, 106, 108 from the PMUXs 94, 96, 98, 100. The RAMDACs convert the binary data into analog video output signals 110, 112, 114. The analog video output signals 110, 112, 114 are then sent to the display monitor.

Upon reference to the foregoing those skilled in the art will appreciate that the Applicants herein have provided a method and system for independent control of multiple windows in a graphics display system. Those skilled in the art will also recognize that modifications may be made to the invention as described and not deviate from the scope and spirit of the invention. For example, the underlying and overlying images have been described with reference to color and overlay planes, respectively. The underlying and overlying images may, however, be stored in underlay and color planes, respectively, wherein underlay planes have a lower priority than color planes. The present invention may be utilized to independently control the underlay and color planes.

While the invention has been particularly shown and described with reference to a preferred embodiment, it will be understood by those skilled in the art that various changes in form and detail may be made therein without departing from the spirit and scope of the invention.

We claim:

1. A method for displaying an image in a graphics display system, said method comprising the steps of;

specifying a first window within a first portion of a display screen included within said graphics display system, whereby said first window is associated with a first plurality of pixels;

specifying intensity data for said first plurality of pixels for an underlying image within said first window, wherein each of said first plurality of pixels within said first window has a first window identifier associated therewith;

specifying a second window within a second portion of said display screen included within said graphics display system, whereby said second window is associated with a second plurality of pixels, and whereby only a portion of said second window overlies a portion of said first window;

specifying intensity data for said second plurality of pixels for an overlying image within said second window, wherein each of said second plurality of pixels within said second window has a second window identifier associated therewith and wherein selected pixels among said second plurality of pixels supersede particular pixels among said first plurality of pixels within said displayed image;

storing said intensity data for all of said first and second plurality of pixels and said first and second window identifiers for said overlying and underlying images in separate locations in a single frame buffer including said superseded pixels among said first plurality of pixels; and displaying an overall image comprised of said underlying image and said overlying image superimposed over at least a portion of said underlying image by utilizing said intensity data and said first and second window identifiers from said single frame buffer, wherein said first and second window identifiers provide for independent control of said first and second windows so that said first plurality of pixels can be updated during display of said overall image.

2. The method for displaying an image in a graphics display system according to claim 1, wherein said graphics display system comprises a color graphics display system, and wherein said step of specifying intensity data for a first plurality of pixels for an underlying image within a first window comprises specifying red, green and blue intensity data for said first plurality of pixels for said underlying image within said first window.

3. The method for displaying an image in a graphics display system according to claim 2, wherein said step of specifying intensity data for a second plurality of pixels for an overlying image within a second window comprises specifying red, green and blue intensity data for said second plurality of pixels for said overlying image within said second window.

4. The method for displaying an image in a graphics display system according to claim 2, wherein said step of specifying intensity data for a second plurality of pixels for an overlying image within a second window comprises specifying intensity data representing clear for said second plurality of pixels for said overlying image within said second window, wherein all or a portion of said overlying image is transparent.

5. The method for displaying an image in a graphics display system according to claim 1, wherein said step of storing said intensity data for each of said first and second plurality of pixels and said first and second window identifiers for said overlying and underlying images in separate locations in a single frame buffer comprises storing said intensity data for each of said first and second plurality of pixels for said underlying and overlying images in color and overlay planes, respectively, within said single frame buffer.

6. The method for displaying an image in a graphics display system according to claim 1, wherein said step of storing said intensity data for each of said first and second plurality of pixels and said first and second window identifiers for said overlying and underlying images in separate locations in a single frame buffer comprises storing said first and second window identifiers for said overlying and underlying images in separate window identification planes within said single frame buffer.

7. A frame buffer to be utilized in displaying an image in a graphics display system, said frame buffer comprising:

at least one color plane, wherein said at least one color plane comprises a first plurality of pixels, and wherein said at least one color plane comprises a rendered image for display on a display screen;

at least one overlay plane, wherein said at least one overlay plane comprises a second plurality of pixels, and wherein said second plurality of pixels supersedes at least a portion of said first plurality of pixels on said display screen;

a first window identification plane associated with said at least one color plane, wherein said first window identification plane defines at least a first window for displaying at least a portion of said first plurality of pixels; and a second window identification plane associated with said at least one overlay plane, wherein said second window plane defines at least a second window, and wherein said first and second window identification planes provide for independent control of said at least first and second windows such that when said first and second plurality of pixels are displayed within said at least first and second windows, said portion of first plurality of pixels which are superseded by said second plurality of pixels may be updated during display of said second plurality of pixels.

8. The frame buffer to be utilized in displaying an image in a graphics display system according to claim 7, wherein said graphics display system comprises a color graphics display system, and wherein said first plurality of pixels comprise red, green, and blue intensity data, and wherein said red, green, and blue intensity data comprise said rendered image for display on said display screen.

9. The frame buffer to be utilized in displaying an image in a graphics display system according to claim 7, wherein said frame buffer provides for double buffering of intensity data for said first and second plurality of pixels.

10. A graphics display system for displaying an image on a display device, said graphics display system comprises:

means for specifying a first window within a first portion of a display screen of said display device, whereby said first window is associated with a first plurality of pixel;

means for specifying intensity data for said first plurality of pixels for an underlying image within said first window, wherein each of said first plurality of pixels within said first window has a first window identifier associated therewith;

means for specifying a second window within a second portion of said display screen, whereby said second window is associated with a second plurality of pixels, and whereby a only portion of said second window overlies a portion of said first window;

means for specifying intensity data for said second plurality of pixels for an overlying image within said second window, wherein each of said second plurality of pixels within said second window has a second window identifier associated therewith and wherein selected pixels among said second plurality of pixels supersede particular pixels among said first plurality of pixels within said displayed image;

means for storing said intensity data for all of said first and second plurality of pixels and said first and second window identifiers for said overlying and underlying images in separate locations in a single frame buffer including said superseded pixels among said first plurality of pixels; and means for displaying an overall image comprised of said underlying image and said overlying image superimposed over at least a portion of said underlying image by utilizing said intensity data and said first and second window identifiers from said single frame buffer, wherein said first and second window identifiers provide for independent control of said first and second windows so that said first plurality of pixels can be updated during display of said overall image.

11. The graphics display system for displaying an image on a display device according to claim 10, wherein said graphics display system comprises a color graphics display system, and wherein said means for specifying intensity data for a first plurality of pixels for an underlying image within a first window comprises means for specifying red, green and blue intensity data for said first plurality of pixels for said underlying image within said first window.

12. The graphics display system for displaying an image on a display device according to claim 11, wherein said means for specifying intensity data for a second plurality of pixels for an overlying image within a second window comprises means for specifying red, green and blue intensity data for said second plurality of pixels for said overlying image within said second window.

13. The graphics display system for displaying an image on a display device according to claim 11, wherein said means for specifying intensity data for a second plurality of pixels for an overlying image within a second window comprises means for specifying intensity data representing clear for said second plurality of pixels for said overlying image within said second window, wherein all or a portion of said overlying image is transparent.

14. The graphics display system for displaying an image on a display device according to claim 10, wherein said means for storing said intensity data for each of said first and second plurality of pixels and said first and second window identifiers for said overlying and underlying images in separate locations in a single frame buffer comprises means for storing said intensity data for each of said first and second plurality of pixels for said underlying and overlying images in color and overlay planes, respectively, within said single frame buffer.

15. The graphics display system for displaying an image on a display device according to claim 10, wherein said means for storing said intensity data for each of said first and second plurality of pixels and said first and second window identifiers for said overlying and underlying images in separate locations in a single frame buffer comprises means for storing said first and second window identifiers for said overlying and underlying images in separate window identification planes within said single frame buffer.

* * * * *